US007343800B2

(12) United States Patent
Harman et al.

(10) Patent No.: US 7,343,800 B2
(45) Date of Patent: Mar. 18, 2008

(54) LINEAR POSITION INDICATOR SYSTEM AND METHOD

(75) Inventors: Robert M. Harman, Troutville, VA (US); Philip R. Couch, Honiton (GB); Alexander M. Barry, Roanoke, VA (US); David M. Dixon, Salem, VA (US)

(73) Assignee: FB iMonitoring, Inc., Roanoke, VA (US)

( * ) Notice: Subject to any disclaimer, the term of this patent is extended or adjusted under 35 U.S.C. 154(b) by 0 days.

(21) Appl. No.: 11/525,501

(22) Filed: Sep. 22, 2006

(65) Prior Publication Data

US 2007/0186648 A1 Aug. 16, 2007

Related U.S. Application Data

(60) Provisional application No. 60/720,132, filed on Sep. 23, 2005.

(51) Int. Cl.
*G01F 23/68* (2006.01)
(52) U.S. Cl. .......................... 73/319; 73/313; 73/322.5
(58) Field of Classification Search .................. 73/319, 73/313, 322.5
See application file for complete search history.

(56) References Cited

U.S. PATENT DOCUMENTS

| 3,823,328 | A | 7/1974 | Barton et al. |
|---|---|---|---|
| 3,976,963 | A | 8/1976 | Kubler |
| 4,080,828 | A | 3/1978 | Akita et al. |
| 4,365,510 | A | 12/1982 | Imhof et al. |
| 4,589,282 | A | 5/1986 | Dumery |
| 4,730,491 | A | 3/1988 | Lew |
| 4,891,980 | A | 1/1990 | Kawai et al. |
| 4,976,146 | A | 12/1990 | Senghaas et al. |
| 5,056,049 | A | 10/1991 | O'Neill |
| 5,224,379 | A | 7/1993 | Koebernik et al. |
| 5,793,200 | A | 8/1998 | Berrill |
| 6,253,611 | B1 | 7/2001 | Varga et al. |
| 6,363,785 | B1 | 4/2002 | Senghaas et al. |
| 6,563,306 | B2 | 5/2003 | Sato |
| 6,571,626 | B1 | 6/2003 | Herford |
| 2001/0054312 | A1* | 12/2001 | Czarnek ...................... 73/313 |
| 2004/0221647 | A1 | 11/2004 | Sabatino |

FOREIGN PATENT DOCUMENTS

| WO | WO 97/13122 | 4/1997 |
|---|---|---|
| WO | WO 2006/055006 | 5/2006 |

* cited by examiner

*Primary Examiner*—Daniel S. Larkin
*Assistant Examiner*—Paul M West
(74) *Attorney, Agent, or Firm*—Mueller Smith (57) ABSTRACT

The present invention is directed to system and method for determining a fluid level. The system comprises a sensing rod assembly comprised of releasably connectable rod segments. Each rod segment carries a processor and a plurality of inductors. Each inductor generates a position signal responsive to a float signal. A float assembly comprises a housing containing a circuit having an integrally formed coil periodically energizable by a processor to emit the float signal. A control assembly receives the generated position signals and determines the fluid level. The method comprises providing releasably connectable rod segments with inductors that generate a position signal responsive to a float signal, determining a sensing rod assembly length, forming the sensing rod assembly, disposing it within a container, providing a float assembly periodically actuated to generate a float signal, generating position signals responsive to the float signal and analyzing those signals to determine the fluid level.

21 Claims, 8 Drawing Sheets

LINEAR POSITION INDICATOR SYSTEM AND METHOD

CROSS-REFERENCE TO RELATED APPLICATIONS

This application claims the benefit of provisional Application No. 60/720,132, filed Sep. 23, 2005, the disclosure of which is hereby incorporated by reference.

STATEMENT REGARDING FEDERALLY SPONSORED RESEARCH

Not applicable.

BACKGROUND OF THE INVENTION

A number of fluid level sensing devices currently are available for determining the level of a fluid in a container. For example, in the oil and gas industry systems exist for measuring the levels of oil and water in a tank. One type of system, for example, utilizes ultrasonic technology. For this type of system, sound waves are directed from a remote location onto the surface of the fluid whose level is to be measured. These sound waves are reflected back and the time delay between the transmission of the initial waves and the sensed reflected waves indicates the fluid level of the fluid in the tank. Ultrasonic technology has proven inaccurate, however, as it is difficult to accurately predict the tank environment. Factors such as humidity, temperature fluctuations, pressure fluctuations, etc. make ultrasonic technology ill-suited for fluid level measurement.

A number of systems also have been developed using Reed switch technology. Generally, these devices include a rod assembly having a plurality of discrete Reed switches located along its length. A permanent magnet is provided, generally in the form of a float assembly, that floats on the surface of the fluid whose level is desired to be measured. As the float rises and falls with the fluid level, the magnetic field generated by the permanent magnet causes the Reed switches to close. The state of the Reed switches, being in either an open or closed configuration, indicates the fluid level. See, for example, U.S. Pat. Nos. 3,976,963; 4,730,491; 4,976,146; and 6,571,626. U.S. Pat. Nos. 4,589,282; 5,793,200 and 6,563,306 disclose similar systems but incorporate Hall effect sensors rather than Reed switches.

Published PCT application WO 97/13122 discloses a sensor system utilizing a rod assembly having a plurality of coils wound along its length. A float assembly having a combination resonator coil and capacitor or ferromagnetic coil interacts with the rod assembly coils to provide position location information from which the fluid level can be determined.

Systems such as those described above often include an integrally formed rod assembly that may be 20 to 30 feet in length. Transportation and installation of large numbers of rod assemblies having those lengths is difficult and expensive. The total cost of these systems also is affected by the implementation of Reed switches, which are a relatively expensive component. For Reed switch systems, the accuracy of the system is dependant on the number of switches spaced apart along the rod assembly. As such, the more accurate the system, the more costly it becomes.

In the oil and gas industry, a customer may have thousands of wells for which the fluid levels of multiple fluids are desired to be measured. For example, a typical tank will contain both oil and water, and a customer may desire to know the respective levels of both fluids. Water has a specific gravity of 1, while the specific gravity of crude oil, e.g., from California, Mexico, or Texas, ranges from between about 0.8 to about 0.9 at 60° F. The relative closeness of the specific gravities of oil and water makes simultaneous measurement of these fluid levels difficult.

Because of the number of wells and the relatively harsh conditions in which the wells are located, an advantageous fluid level indicator system must be easily shipped and installed, have a long lifespan, and require little maintenance. Such a system also must be readily able to accurately determine the fluid levels of multiple fluids contained with a tank. Generated well data must be easily accessible by the customer.

BRIEF SUMMARY OF THE INVENTION

Disclosed herein is an improved linear position indicator system and method for accurately measuring one or more fluid levels in a container. One feature of the linear position indicator system is a sensing rod assembly formed from connectable rod segments. With this approach, disassembled rod segments may be easily and inexpensively shipped to the field where they may be assembled into a rod assembly of any given length.

Another feature of the invention is a unique float assembly that floats on the surface of the fluid whose fluid level is to be measured. The float assembly is designed to periodically generate a low amplitude float signal corresponding to the position of the float assembly. Specifically, the float assembly includes a circuit having an integrally formed coil which is energizable, for example, at 3 second intervals, to generate the float signal. A processor is provided within the float assembly to control the generation of the float signals. Sensitive inductors are provided along each rod segment of the sensing rod assembly for detecting the low amplitude float signal and generating a position signal responsive thereto. In a container having a second fluid whose level is to be measured, a second float assembly is provided, which floats on the surface of the second fluid. The second float assembly is configured in the same fashion as the first float assembly but periodically transmits its float signal at a different interval, for example, 3.25 seconds. A plurality of floats could be used in this fashion to detect fluid of varying densities A control assembly associated with the sensing rod assembly contains a processor programmed to receive the position signals generated by the inductors and analyzes the signals to determine the level of the fluid within the container. The processor may be programmed for a simple data analysis or more complex data analysis may be implemented to improve the accuracy of the system.

Also broadly disclosed herein is are methods for determining the fluid level of a fluid contained within a container. One embodiment of the method comprises the steps of:

(a) providing a plurality of releasably connectable rod segments, each rod segment extending a given rod segment length and having a plurality of inductors located along said length, each said inductor being responsive to a float signal to generate a position signal;

(d) determining a sensing rod assembly length based on the depth of said container;

(e) forming a sensing rod assembly having said rod assembly length by connecting a plurality of rod segments;

(f) disposing said sensing rod assembly generally vertically within said container;

(g) providing a float assembly that floats on said fluid surface and is vertically movable along said sensing rod assembly, said float assembly comprising a circuit having an integrally formed coil excitable to generate a float signal corresponding to the position of said float assembly;

(g) periodically exciting said float assembly coil to generate said float signal;

(h) sensing said float signal with said inductors to generate a plurality of position signals; and (i) analyzing said sensed position signals to determine said fluid level of said fluid in said container.

BRIEF DESCRIPTION OF THE DRAWINGS

For a fuller understanding of the nature and advantages of the present invention, reference should be had to the following detailed description taken in connection with the accompanying drawings, in which.

DETAILED DESCRIPTION OF THE INVENTION

Figure 1:
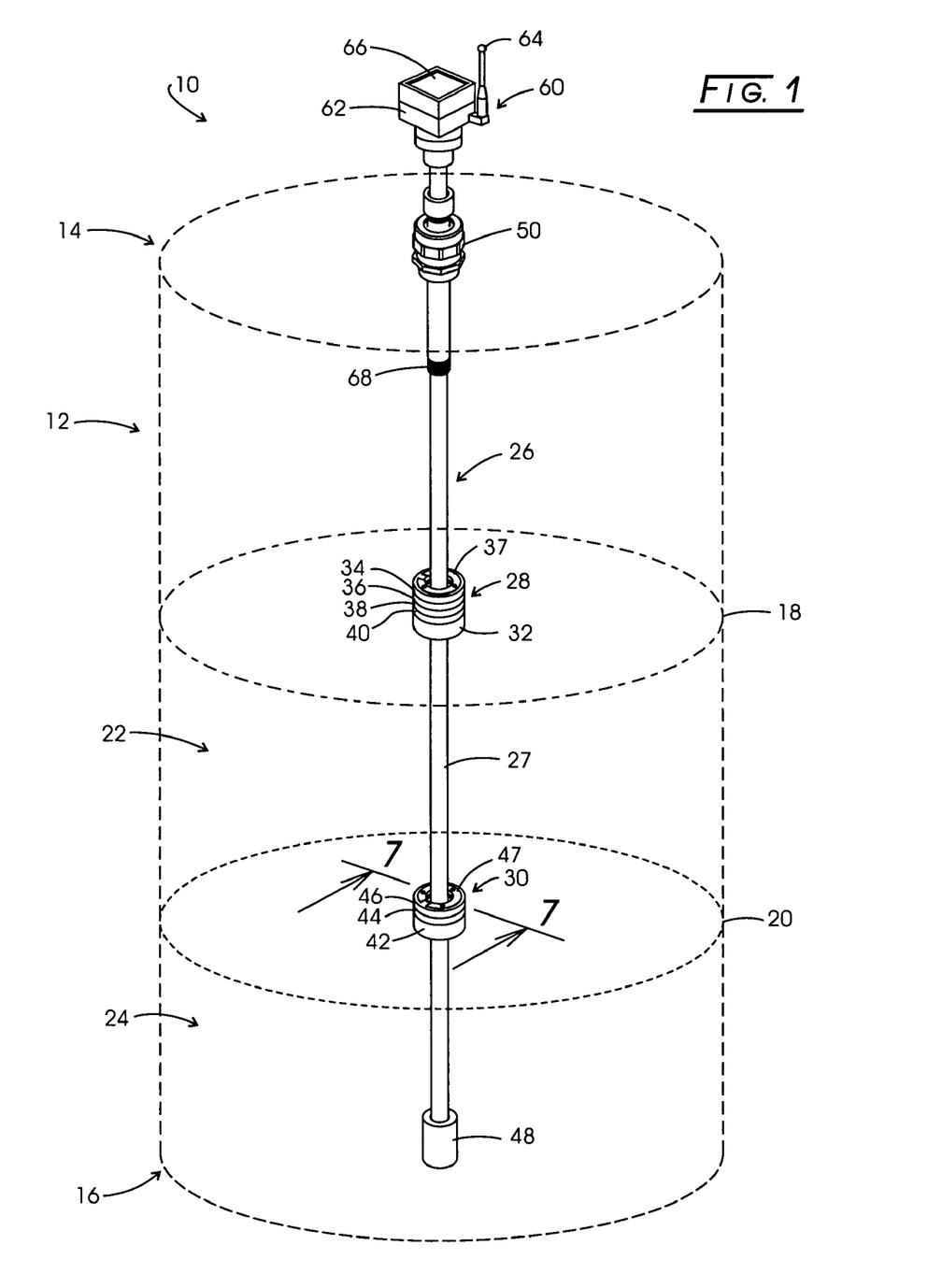
FIG. 1 shows a perspective view of a linear position indicator system having a pair of float assemblies, the system being disposed within a tank containing two fluids whose fluid levels are to be measured.

FIG. 1 illustrates a linear position indicator system shown generally at 10. System 10 is seen to be disposed within an oil storage tank, 12, whose outer dimensions are depicted in dashed lines. Tank 12 extends a given depth between a top portion, 14, and a bottom portion, 16. Contained within tank 12 are two fluids of differing specific gravities whose fluid levels are desired to be measured. The fluids shown in this example are crude oil and water. The fluid level of the first fluid, oil, is indicated in dashed lines at 18, while the fluid level of the second fluid, water, is indicated by dashed lines 20. As was noted above, crude oil has a lower specific gravity than water, so the crude oil present in tank 12 rests upon the water and, thus, has a volume extending between fluid level 18 and fluid level 20 as represented generally at 22. The water contained within tank 12, represented generally at 24, has a volume between fluid level 20 and bottom 16 of tank 12.

FIG. 1 shows system 10 disposed in an oil storage tank; however, the system may be disposed within any container designed to contain one or more fluids, with the construction of the container being appropriate for the fluid contained therein. Additionally, the inclusion of only two fluids within tank 12 is intended for explanatory purposes only. Tank 12 may contain additional fluids of differing specific gravities whose fluid levels are desired to be measured.

Linear position indicator system 10 is seen to include a sensing rod assembly, 26, which extends substantially vertically within tank 12. Sensing rod assembly 26 includes a sensing rod (not shown) enclosed within fiberglass tubing, 27. Tubing 27 extends generally between top 14 and bottom 16 of tank 12 and protects sensing rod assembly 26 from fluids and contaminants contained within tank 12. Positioned about fiber glass tubing 27 are a pair of float assemblies, 28 and 30. Float assembly 28 is seen to float on the surface of crude oil 22 at fluid level 18 and includes a signal generating encapsulate, 32, to which is attached an amount of buoyant material provided in this example as four disks of closed cell foam. Such foam is commercially available from Rogers Corporation of Rogers, Conn. under the trade name NITROPHYL. Float assembly 30 is seen to float on the surface of water 24 at fluid level 20 and includes a signal generating encapsulate, 42, of the same size, shape and density as encapsulate 32, and a pair of disks, 44 and 46. Foam disks 44 and 46 are formed of the same closed cell foam as disks 34-40. Because the specific gravity of water is greater than that of crude oil, only two disks are required to enable encapsulate 30 to float on the surface of water 24. For a given float assembly, the amount of buoyant material required to enable the float assembly to float on the surface of a given fluid is determined based on the specific gravity of the selected fluid and the density of the encapsulate.

At one end of tubing 27 is an end cap, 48, which weights the rod and protects the sensing rod assembly from being damaged by contacting the bottom surface of tank 12. At the opposite end of tubing 27 is a connector, 50, which connects sensing rod assembly 26 to a control assembly 60. As will be described in greater detail below and specifically in connection with FIG. 13, control assembly 60 controls the operation of system 10. In operation, each of the float assemblies 28 and 30 periodically generates a float signal. When a float signal from either of the float assemblies is sensed by sensing rod assembly 26, sensing rod assembly 26 generates a position signal responsive thereto. Those signals are transmitted to control assembly 60, which processes the received position signals to accurately determine the position of each of the floats, and correspondingly, the fluid levels of the fluids on which the fluid assemblies float. Control assembly 60 is seen to include a housing, 62, having an antenna, 64, for wirelessly transmitting data from tank 12 to another location. The other location may be, for example, a customer's central location. With such wireless capability, data from a multitude of tanks may be transmitted and monitored at the central location. A solar panel, 66, with associated charge storage device, is provided as a power supply electrically associated with control assembly 60. Such a solar panel is advantageous for containers, such as crude oil tanks, which are located outdoors in areas with sufficient amounts of sunlight. Alternatively, control assembly 60 may be powered by any other conventional power supply, such as a battery, or unconventional power supply such as thermal scavenging.

Figure 2:
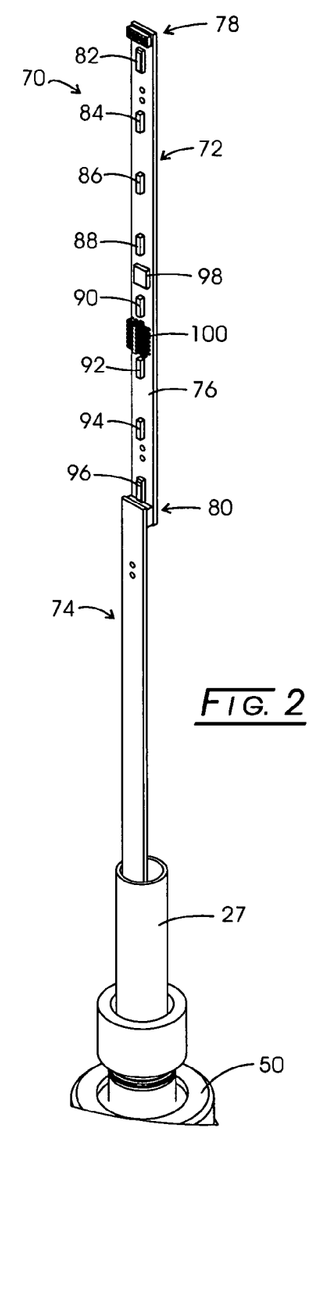
FIG. 2 shows two connected rod segments being inserted within a fiberglass tube.

One of the advantages of system 10 is that rod assembly 26, including tubing 27 and the sensing rod contained therein, are segmented to enable a custom system of any desired length to be constructed in the field. For example, tubing 27, may be formed of segments of a given length which are connected together by threads such as those shown at 68 in FIG. 1. Turning to FIG. 2, the sensing rod assembly, 70, of system 10 is seen being inserted into tubing 27, which would occur during installation of system 10 into tank 12. Components previously identified in FIG. 1 retain their prior numeration. Sensing rod assembly, 70, is formed of a plurality of sensing rods, two of which are seen generally in FIG. 2 at 72 and 74. Looking at FIGS. 2 and 5, it may be seen that rod segment 72 is formed as a printed circuit board (PCB), 76, extending a given length between a top portion 78 and a bottom portion, 80. In this embodiment, each rod segment has a length of about 12 inches. This length is intended to be illustrative, only, as the sensing rod assembly may be formed from a plurality of rod segments of any given length. A rod segment having a length of 19 inches is discussed later in connection with FIG. 12. Longer or shorter rod segments may be desired in view of cost considerations and the customer's specific needs.

Figure 5:
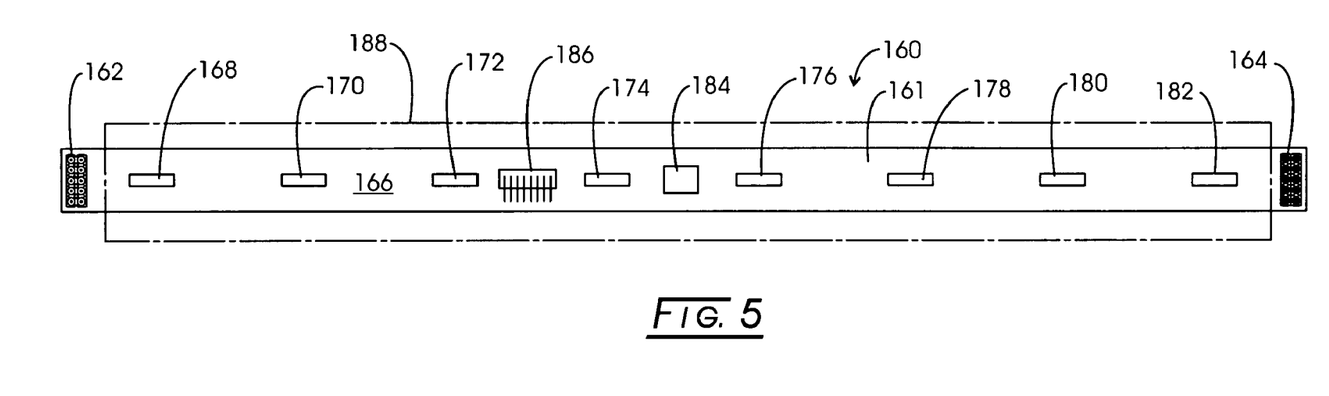
FIG. 5 is a top view of a rod segment illustrating a plurality of spaced apart RFID transponder coils, a microprocessor, rod segment connector components, and a programming component.

PCB 76 has 8 inductors, 82, 84, 86, 88, 90, 92, 94, and 96, spaced apart at, for example, 1.5 inch intervals along its length. These inductors may be wirewound, surface mounted Radio Frequency Identification (RFID) transponder coils (ferrite core inductors), which exhibit relatively high sensitivity making them advantageous for sensing low amplitude signals. Such RFID coils, having a part number of 5315TC, are commercially available from Coilcraft, Inc. of Cary, Ill. The read distance for these coils is about 16 to 30 inches, and they are impact resistant and capable of operating at high temperatures. PCB 76 also bears a microprocessor, 98, located between RFID transponder coils 88 and 90.

RFID transponder coils 82 to 96 sense the float signals generated by the float assemblies 28 and 30 (FIG. 1) and each coil will generate a position signal responsive thereto. For example, when a float assembly is located adjacent a particular coil, that coil will generate a position signal having the maximum amplitude that the coil can generate. The greater the distance between the float assembly and a specific coil, the smaller the magnitude of the position signal generated by that coil. When the distance between the float assembly and a coil exceeds the signal sensitivity of the coil, the coil will not detect the signal. Starting at the bottommost PCB of the sensing rod, the signals for all the RFID coils are transmitted from one PCB to the next PCB. The resulting array of position signal data then is transmitted to control system 60. A programming connector is provided at 100, which enables a user to easily update the programming of microprocessor 98.

Figures 3, 4:
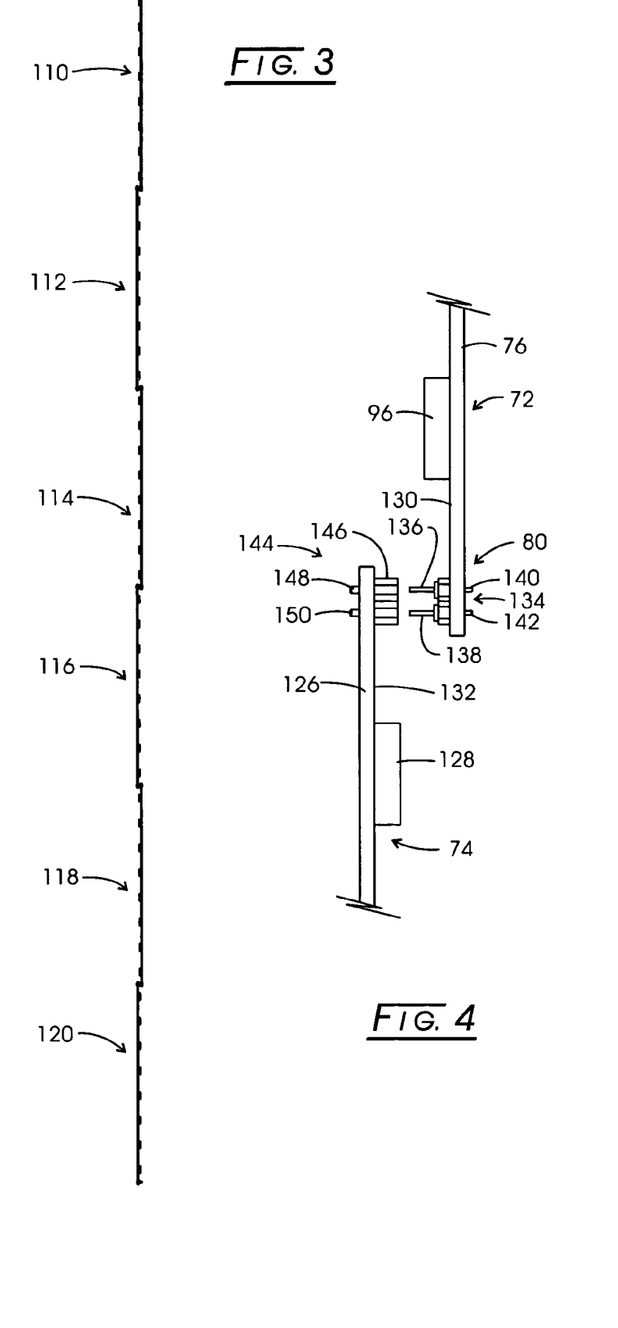
FIG. 3 illustrates a portion of a sensing rod assembly embodiment including six rod segments releasably connected together.
FIG. 4 is an exploded view showing the connector components on two adjacent rod segments.

Generally, the fluid levels desired to be measured will range over the entire depth of the container in which linear position indicator system 10 is disposed. As such, the required length of the sensing rod assembly 70 will be determined by the depth of the container. The proper number of rod segments then may be connected together to form a sensing rod assembly commensurate in length to that depth. Clearly, the linear position indicator system may be configured having a sensing rod assembly having a length less than the depth of the container if desired. FIG. 3 illustrates an assembled sensing rod assembly, 108, having six rod segments, 110, 112, 114, 116, 118, and 120 connected together to give the sensing rod assembly a total length of about 6 feet. This figure also reveals that each rod segment, 110 to 120, inclusive, includes 8 RFID transponder coils. The number, type and position of inductors located along each rod segment may be selected to adapt the sensing rod assembly to a given customer's specific needs. For example, as the skilled artisan will appreciate, additional inductors may easily be added to increase the accuracy of the resulting system but such addition may concomitantly represent additional expense.

Looking to FIG. 4, an exploded view of bottom portion 80 illustrates the releasable connection of rod segments 72 and 74 shown previously in FIG. 2. Rod segment 72 again includes PCB 76 and RFID transponder coil 96. Rod segment 74 is constructed in the same manner as rod segment 72 and is seen to include PCB 126 and RFID transponder coil 128. The two rod segments are positioned opposite one another so that the top surface, 130, of PCB 76 faces top surface 132 of PCB 126. Bottom end 80 of rod segment 72 includes a male connector component 134 having two rows of pins, the end pins of which are shown at 136 and 138. Male connector component 134 is mounted to a pair of through holes in PCB 76 as indicated at 140 and 142. The top portion, 144, of PCB 126 includes a corresponding female connector component 146 mounted to PCB 126 by through holes as at 148 and 150. Male connector component 134 and female connector component 146 are configured to releasable secure rod segments 72 and 74 together. Every rod segment has the same configuration, with a male connector component at one end and a female connector component at the other. To form a rod assembly, the rod segments are sequentially connected together as shown in FIG. 4 to form a completed sensing rod assembly such as that shown in FIG. 3. Other conventional or customized connector components may be used as convenient or desired to releasably secure the rod segments together. It should be noted that connector components, such as those shown, provide a connection resistant to separation when acted on by vertical forces, i.e., as may be applied when a sensing rod is withdrawn from a container.

FIG. 5 shows a top view of a standard rod segment, 160, which is seen to include a PCB, 161, having a female connector component, 162, at one end and a male connector component, 164, at the opposite end. The top surface, 166, of PCB 161 again includes 8 RFID transponder coils, 168 through 182, a microprocessor, 184, and a programming connector, 186. Once the rod segments are connected together to form a rod assembly, that assembly is inserted within fiberglass tubing, as described previously at 27 in FIG. 1. That fiberglass tubing 27 is sealed to protect the sensing rod assembly from exposure to fluids, contaminants, etc. Such sealing is particularly important when a fluid contained in the container is explosive, as in crude oil tanks. To provide additional protection, rod segment 160 is seen to be coated with a potting compound, 188, such as an acrylic, polyurethane, epoxy, etc.

Figure 6:
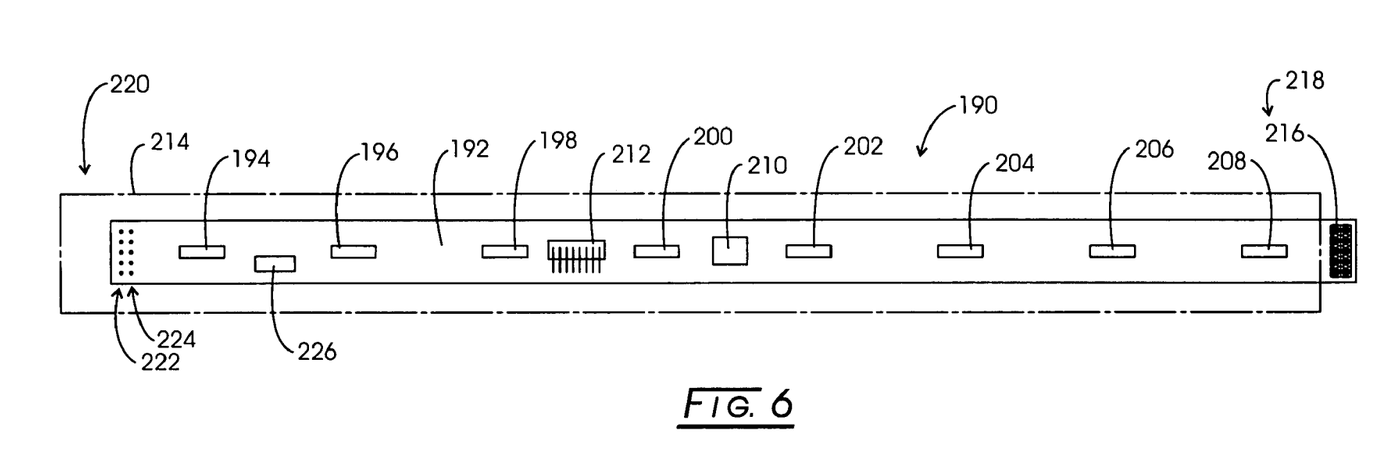
FIG. 6 is a top view of a bottommost rod segment.

FIG. 6 reveals a rod segment, 190, that is specifically designed to be used as the bottommost rod segment of a sensing rod assembly. Rod segment 190 is seen to include PCB, 192, RFID transponder coils, 194 through 208, a microprocessor, 210, and a programming connector, 212. At top portion 218, rod segment 190 includes a male connector component, 216; however, at the opposite end, 220, rod segment 190 includes two arrays of through holes, as at 222 and 224, but a female connector component is not provided. This connector is not necessary as rod segment 190 is the bottommost rod segment and another rod segment will not be connected to it. Like rod segment 160, rod segment 190 also is seen to be encased within potting compound, 214. It should be noted that for this bottommost rod segment, potting compound 214 encases the entire bottom portion 220. Rod segment 190 also may include a float switch or conductivity sensor (not shown) to detect the ingress of fluids from container 12 if leakage occurs, in order to permit servicing before the fluid reaches the electronic components. Rod segment 190 also includes an additional component, namely, a jumper component, 226. Jumper component 226 enables communications from control assembly 60 to loop around and passed up the chain of connected rod segments back to control assembly 60.

Each rod segment communicates in one direction using an asynchronous serial protocol at 9600 bps. Signals are received at the bottom end of the rod segment and transmitted at the top. In a sensing rod, the signal from control assembly 60 is routed all the way down the sensing rod without amplification to the receiver of the bottom card. Communication then is looped by jumper 226, as noted above, daisy chained though all rod segments and emerges at the top to return to control assembly 60.

Each rod segment powers down, or "sleeps," as much as possible to conserve energy. It must therefore wake on the leading edge transition of a received communication byte. Thus, typically the rod segment microcontroller wakes on the first edge of a command byte and then stays awake to be interrupted again at the end of this byte. This byte defines the command and begins a command sequence and is followed by a zero byte from the host. The rod segment passes the command byte as quickly as possible to minimize command latency along the set of rod segments. It also starts the command timer from the receipt of this command byte. It then increments the next byte and passes this on also, so this becomes a count of the number of rod segments from the bottom, or the total number of rod segments by the time it returns to control assembly 60.

Following the two command bytes, the rod segment reschedules upcoming reading and search activities to avoid conflicts and waits a length of time to ensure any active reading is completed. It then executes the command (e.g., gets reading values, does temperature reading, or self-test) and prepares the result for transmission. Any received data in this time from a lower rod segment is buffered in a circular buffer to ensure that the data is sent in the proper sequence. At the appropriate time, the results and buffered data are transmitted.

The rod segments are powered by a nominal 3.3v supply from control assembly 60. This supply is a current limited, intrinsically safe deign, and the current limiting resistor is on each individual rod segment. Local current limiting saves needing one current limit large enough to serve all rod segments at once, as this current limit might be too large for the required safety. The greatest current consumption occurs when several rod segments are transmitting and receiving a data set up through the sensing rod chain. In order to constrain this peak current, the time of transmission is scheduled so that not all rod segments can transmit at the same time. For example, 5 rod segments may be permitted to transmit simultaneously, and this achieved by buffering the communication at each node and scheduling the start of transmission later in each successive node through the chain. As a result the lowest rod segments complete transmission first, before rod segments further along the chain are active. The result is a wave of data transfer and power consumption traveling along the length of the sensing rod, and a more constant current consumption during this time from control assembly 60. Thus, a select number of rod segments are active at any time, and the peak current is much lower than if all data was transferred immediately by all rod segments at the same time.

Each rod segment's microcontroller uses two clock sources, one 32 kHz clock used for a timing reference, and a higher frequency internal clock used as a processor core clock when the processor is active. The latter clock frequency defines some time critical functions such as the serial data rate, the ADC sample timing, and the self test cycles. It is important, therefore, that this clock frequency is fairly accurate and stable. Accuracy is derived by regularly measuring the high frequency clock against the 32 kHz clock and adjusting the high frequency clock to ensure the correct ratio. The 32 kHz clock is used directly as a timer clock for defining the search period and float timing period, etc.

Figure 7:
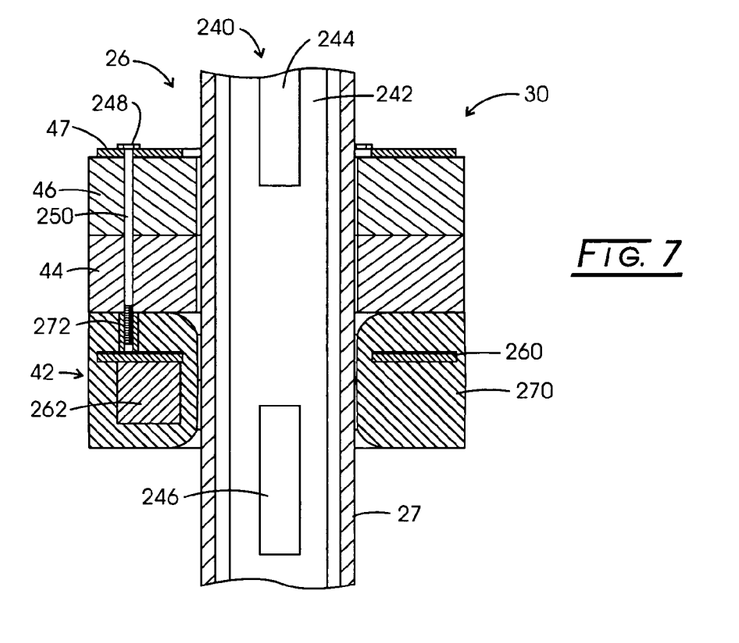
FIG. 7 is a cross-sectional view taken through the plane 7-7 in FIG. 1 and showing in greater detail a portion of the sensing rod assembly and second float assembly.
Figure 8:
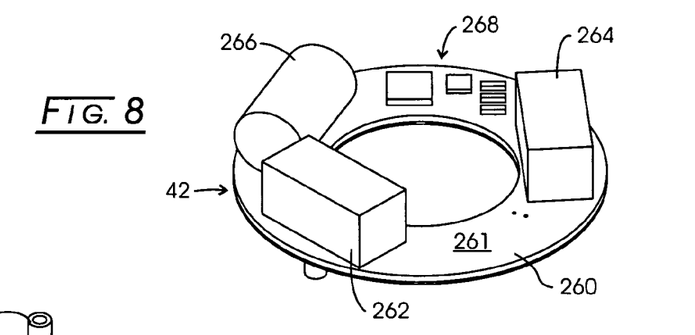
FIG. 8 is a perspective top view of the encapsulate of the second float assembly which includes a circuit, battery, and spacer material.
Figure 9:
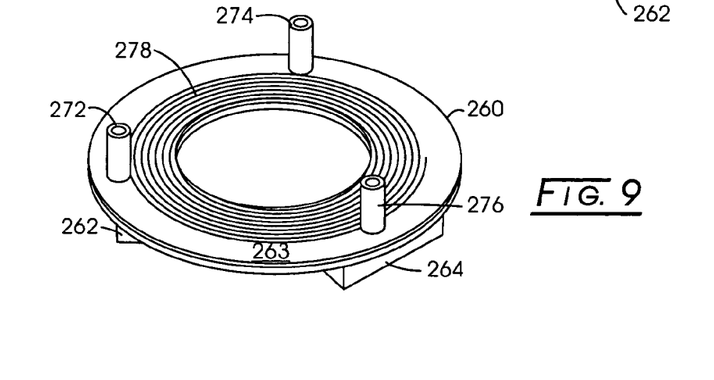
FIG. 9 is a perspective bottom view of the encapsulate shown in FIG. 8.

FIGS. 7-9 illustrate the float assembly of linear position indicator system 10 in greater detail. FIG. 7 is a cross-sectional view of float assembly 30 taken through the plane 7-7 in FIG. 1. Components previously identified in FIG. 1 retain their prior numeration. From this figure it may be seen that float assembly 30 has a generally doughnut shape with a centrally disposed aperture which enables float assembly 30 to encompass sensing rod assembly 26 and move freely along the vertical length of sensing rod assembly 26. As noted previously, sensing rod assembly 26 includes fiberglass tubing 27 within which is inserted a sensing rod including a plurality of rod segments, such as 240. The portion of rod segment 240 shown includes PCB 242 and RFID transponder coils 244 and 246. Float assembly 30 includes signal generating encapsulate 42, foam disks 44 and 46, and a cover, 47.

Turning to FIG. 8, the internal components of encapsulate 42 are shown. Encapsulate 42 includes a PCB 260 one surface, 261, of which bears a pair of styrophome spacers, 262 and 264, a power supply, 266, and a float assembly control circuit, 268. In this embodiment, power supply 266 is provided as a 3 Volt lithium non-rechargeable battery. Other power supplies may be used. In selecting the power supply, its voltage, shelf-life and weight must all be considered. Control circuit 268 comprises a microprocessor that is connected to battery 266. Looking back to FIG. 7, it may be seen that the components shown in FIG. 8 are encapsulated in a potting compound, 270. To form the completed float assembly 30, foam disks 44 and 46 and cover 47 are secured to three threaded components, 272, 274, and 276, on PCB 260 (FIG. 9) of encapsulate 42 by three screws, one of which is shown in FIG. 7. Screw, 248, extends through a bore, 250, in cover 47 and disks 44 and 46 and connects to threaded component 272. The additional two screws extend through similar bores to connect to the remaining threaded components, 274 and 276.

Turning to FIG. 9, it may be seen that in addition to the three threaded components, surface, 263, of PCB 260 bears a multi-layer coil, 278, formed as a trace, which is connected to control circuit 268. In this embodiment, coil 278 consists of 5 layers, each layer including 21 turns. A small gauge wire coil may be used in place of the integrally formed PCB coil; however, using a coil as at 278 advantageously reduces the size and weight of encapsulate 42. Rather than continuously transmitting a signal from encapsulate 42, control circuit 268 drives coil 278 to periodically generate an approximately 85 kHz square wave. That signal, for example, may be generated about every 3 seconds for a duration of 30 to 40 milliseconds. The signal level is approximately 3V peak to peak. Because encapsulate 42 only periodically generates a low amplitude signal, float assembly 30 exhibits a relatively long lifespan. This feature is particularly advantageous when the linear position indicator system is difficult to access once installed in the container. For the configuration shown, float assembly 30 may have a lifespan of about 5 years with the limiting factor being the shelf-life of the 3 Volt lithium battery. Note that the 3 second drive interval may be changed to meet the specific application requirement, e.g., shorter for quicker response, longer for increased battery life.

If more than one fluid level is desired to be measured, then additional float assemblies may be used. Any number of additional floats may easily be added to the linear position indicator system 10. For example, FIG. 1 illustrates another float assembly 28 measuring the fluid level 18. When additional float assemblies are added, the timing of the float signals generated are controlled to minimize the overlap of signal sensing by the inductors. For example, circuit 268 of float assembly 30 has been described as energizing coil 278 to generate a float signal about every 3 seconds. The control circuit of a second float assembly may be programmed to energize its coil, for example, every 3.25 seconds. Based on the different timings of the float signals, a rod segment can identify which signals are generated a given float assembly. Alternatively, signals from different float assemblies may be identified, for example, by RF frequency or other coding of the float signal. The timing of float signal generation and sensing is discussed further below in connection with the rod segment embodiments illustrated in FIGS. 11 and 12.

Figure 10:
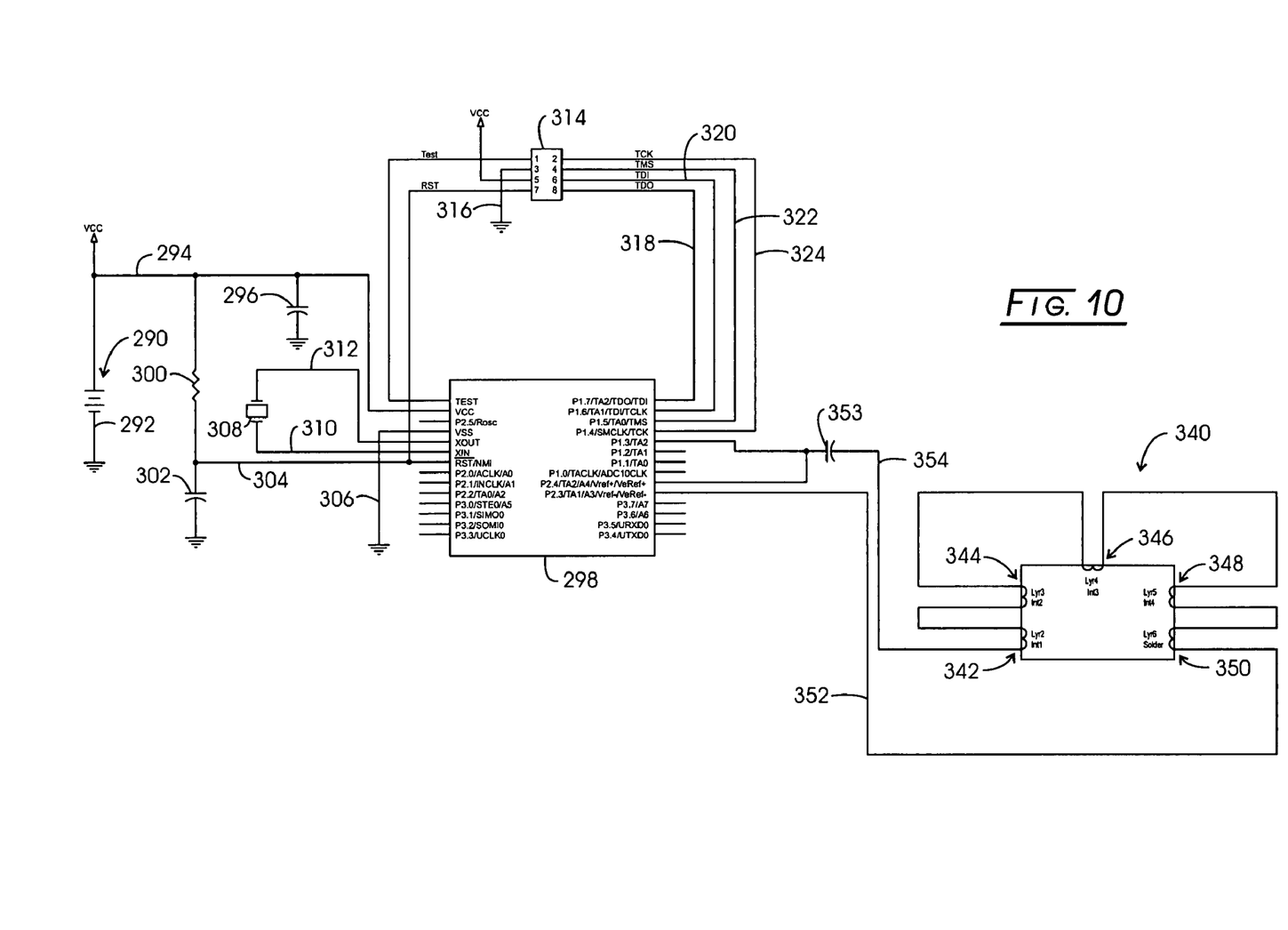
FIG. 10 is a schematic circuit design of one embodiment of a float assembly.

FIG. 10 is a schematic circuit design for one embodiment of a float assembly, such as float assembly 30 in FIG. 1 and FIGS. 7-9. At the far left of FIG. 10, the 3.0 V lithium battery, 290, is shown connected to ground via line 292. The other side of battery 290 is connected to the voltage input of microprocessor 298 through decoupling capacitor 296. Power start-up resistor 300 and capacitor 302 are connected to the reset pin of microprocessor 298 via line 304 to pull the reset line high. Microprocessor 298 is connected to ground via line 306. Microprocessor 298 may be an ultralow-power microprocessor with flash memory available from Texas Instruments of Dallas, Tex. as part number MSP430F1232IPW. The processors disclosed herein generally consist of conventional mixed signal microprocessors; however, as the skilled artisan will appreciate any conventional digital, analog or mixed signal microcontroller may be implemented.

A 32.768 KHz crystal, 308, is connected to microprocessor 298 via line 310. Output from microprocessor 298 to crystal 308 is via line 312. A JTAG programming connector, 314, is connected to ground via line 316 and connected to microprocessor 298 via lines 318, 320, 322, and 324. JTAG programming connector 314 enables the programming of flash memory within microprocessor 298. Connector 314 also is connector to the test pin of microprocessor 298 via line 326 and the reset pin via line 328. A connector, such as 314, is commercially available from Samtec, Inc. of New Albany, Ind. as part number TSM-104-01-T-DV. On the right hand side of the FIG. 10 is a graphical representation of the multi-layer coil described at 278 in connection with FIG. 9. That coil, 340 in FIG. 10, is seen to include 5 layers as at 342, 344, 346, 348, and 350. Coil 340 is connected to microprocessor 298 via lines 352 and 354 including d.c. blocking capacitor 353.

Figure 11:
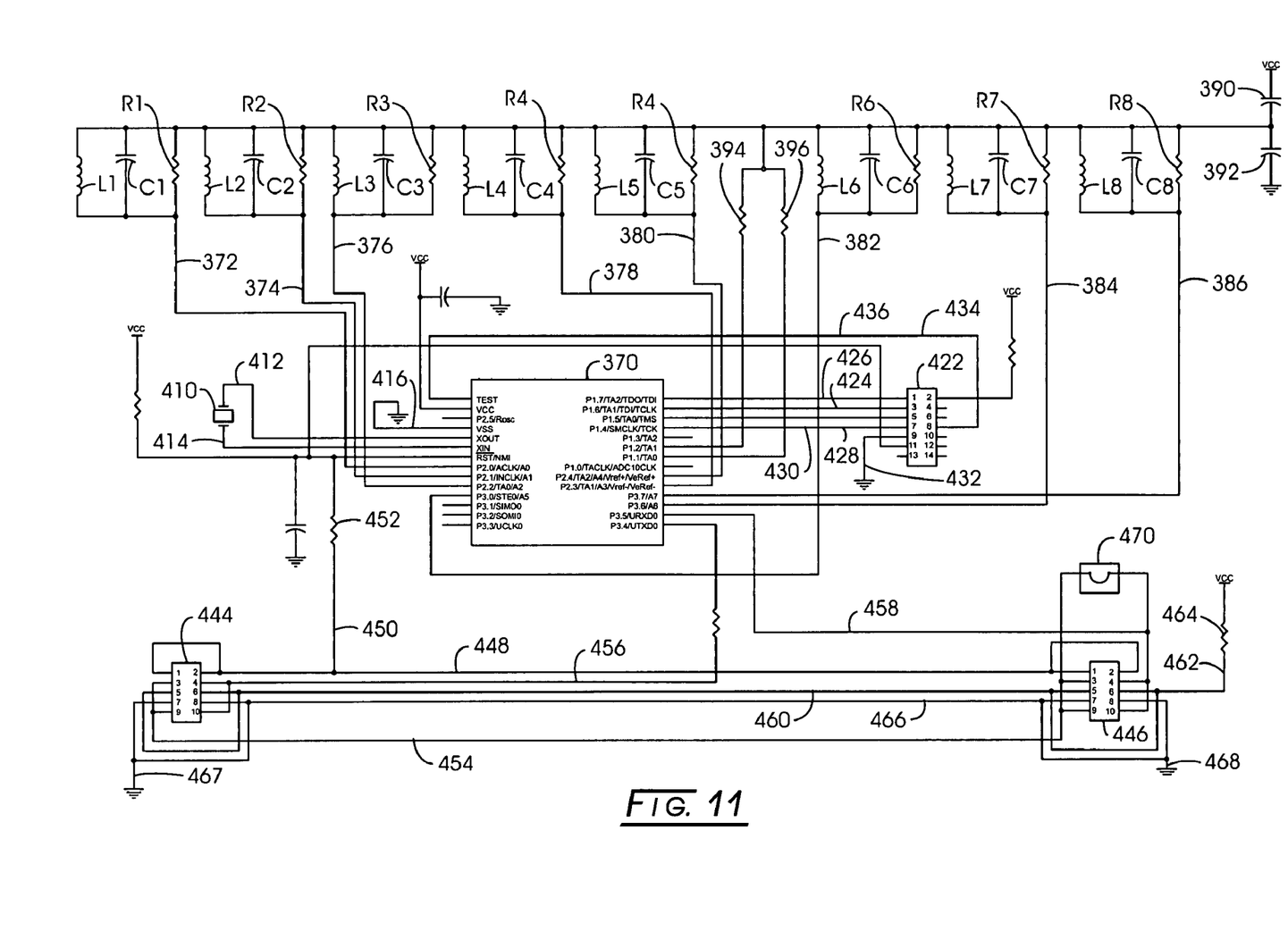
FIG. 11 is a schematic circuit design for one embodiment of a rod assembly incorporating RFID transponder coil components.

FIG. 11 illustrates a schematic circuit design for one embodiment of a rod segment, such as that shown in FIG. 6. Across the top of FIG. 11 is a network of RFID transponder coils connected in series. Each RFID transponder coil includes an inductor in series with a capacitor and a resistor, the resonating capacitor and resistor defining the quality factor of each inductor. For simplicity, the components of each RFID transponder coil have been identified as L, R and C to indicate an inductor, resistor and capacitor, respectively. RFID transponder coils are commercially available, for example, from Coilcraft, Inc. of Cary, Ill. as part number of 5315TC. Each RFID coil transmits an analog signal to ultralow-power microprocessor, 370, which may be of the same type as microprocessor 298 in FIG. 10. The first RFID transponder coil, consisting of L1, C1 and R1, connects to microprocessor 370 via line 372. The second RFID transponder coil connects to microprocessor 370 via line 374. The remaining RFID transponder coils connect to microprocessor 370 via lines 376, 378, 380, 382, 384, and 386 respectively. At the end of the network of RFID transponder coils is a pair of capacitors, 390 and 392, which connect to a.c. signal ground. Between R5 and I6 are a pair of resistors 394 and 396, act as a voltage divider which biases the RFID coils at $V_{cc}$ divided by 2.

In the center on the left hand side of FIG. 11 is a 32.768 KHz crystal, 410, such as that shown at 308 in FIG. 10. Crystal 410 is connected to microprocessor 370 via lines 412 and 414. Microprocessor 370 is connected to ground via line 416. To the right of microprocessor 370 is a JTAG programming connector, 422, connected via lines 424, 426, 428, and 430. Connector 422 is connected to ground via line 432. Connector 422 also is connected to the microprocessor test pin via line 434 and the reset pin via line 436. Connector 422 is commercially available, for example, from Molex of Lisle, Ill. as part number 10-89-4142. Across the bottom of FIG. 11 are a pair of connector components, 444 and 446. These connector components correspond to the female and male connector components located on opposite ends of a rod segment as shown in FIG. 5 at 164 and 162. Female connector component, 444, is commercially available, for example from Samtec, Inc of Cary, Ill. as part number SDL-105-G-10, while male connector component 446 also is commercially available, for example, from Samtec, Inc. as part number BDL-105-G-E. Connector components 444 and 446 are connected to one another via line 448 and to the reset pin of microprocessor 370 via line 450. A power start up resistor is provided at 452 with capacitor 453. Both pins 1 and 2 of female connector component 444 are seen to connect to corresponding pins 1 and 2 of male connector component 446 via line 448. This redundancy is provided to ensure reliability. Likewise, pins 3 and 9 of female connector component 444 are seen to connect to corresponding pins 3 and 9 of male connector component 446 via line 454. Pins 4 and 10 of female connector component receive transmissions from microprocessor 370 via line 456, while male connector component pins 4 and 10 transmit to microprocessor 370 via line 458. Pins 5 and 6 of female connector component 444 connect to corresponding pins 5 and 6 of male connector component 446 via line 460 and then to power via line 462 through resistor 464. Pins 7 and 8 of female connector component 444 connect to corresponding pins 7 and 8 of male connector component 446 via line 466 and then to ground via lines 467 and 468. These connectors provide the communications line to transmit data from the RFID transponder network on each rod segment along adjacent rod segments to control assembly 60 as described previously.

A two connection female jumper component, 470, extends across the two pin header of male connector component 446, which are connected to the TX and RX pins of microprocessor 370. Such a component is available from Molex of Lisle, Ill. as part number 22-12-2021. This component is required only on the bottommost rod segment of a sensing rod assembly and creates a communications loop, allowing communications to pass down through the connected rod segments from control assembly 60 and back around and up through the connected rod segments to control assembly 60. Thus, for example, control assembly 60 may generate a signal prompting the RFID transponder coils to sense a float signal. Sensed data from the RFID transponder coils then is passed up from the rod segments back to control assembly 60.

In order to identify faulty rod segments, a self-test is provided. Each inductor, L1 to L8, connects to microcontroller 370 on a pin that may be defined as an I/O or as an ADC input. For self-test, the output is driven with a cycle of signal approximately at the inductor resonance rate, the pin is then immediately switched to the ADC measurement mode and a quick sequence of measurement samples is taken. The amplitude of the signal at each of these samples is determined by the resonance frequency, the ring-down rate (related to Q) and the sample times, which are know so long as the clock is stable. A normal range may be developed based on the measured values for operational rod segments. Giving bounds around these values, unexpected inductor resonance behavior indicates a fault.

Figure 12:
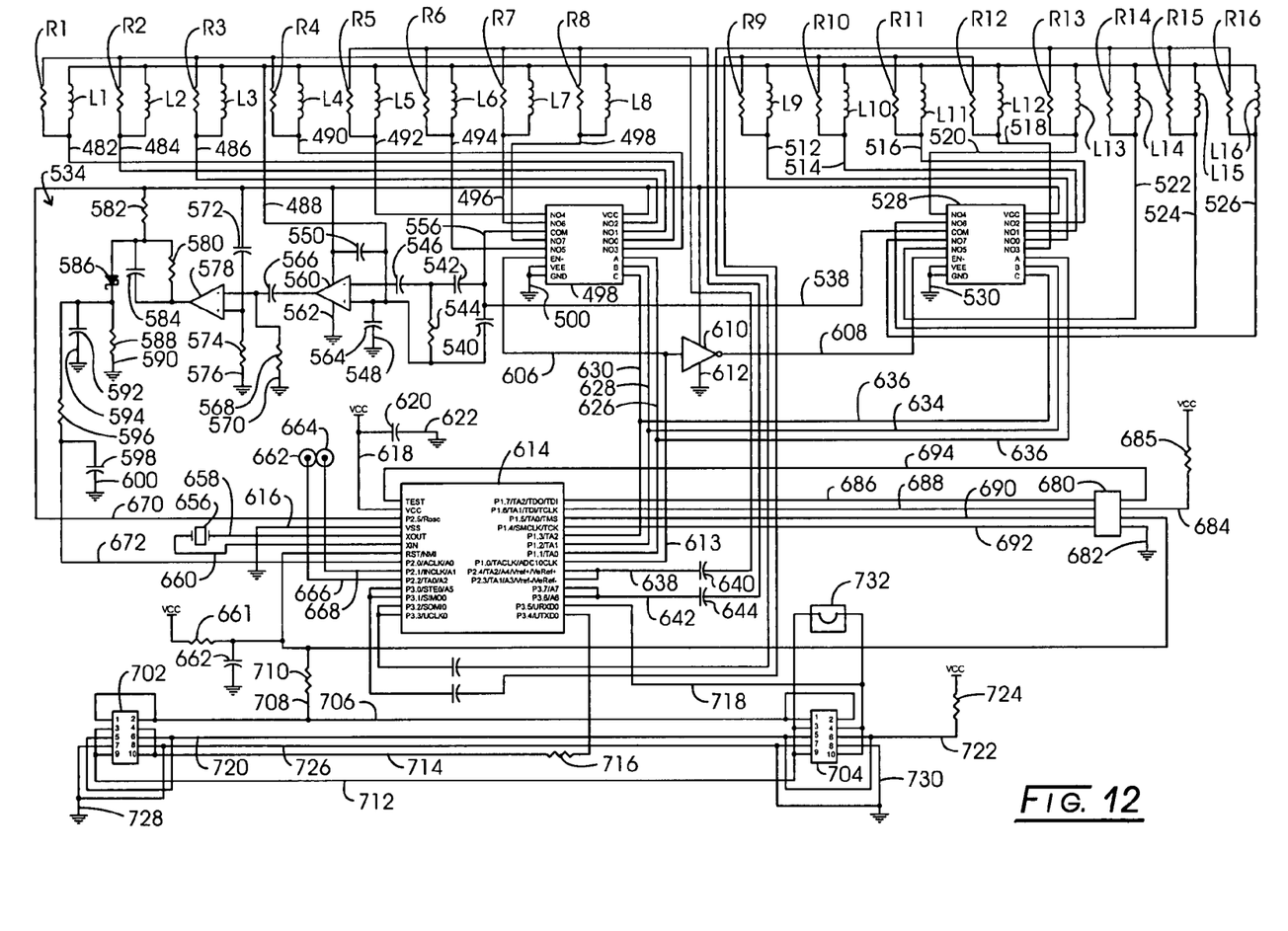
FIG. 12 is a schematic circuit design of another embodiment of a rod assembly incorporating circuits having integrally formed coil components.

FIG. 12 shows an alternative schematic design for a rod 19 inch rod segment having a plurality of inductors integrally formed onto a printed circuit board, in similar fashion as described with respect to coil 278 of float assembly 30. These coils perform the function of the previously recited RFID transponder coil network shown and described in connection with FIG. 11. Looking to the top of FIG. 12, an inductor network is seen to include 16 inductors, identified as L1 through L16, inclusive. The voltage generated by each inductor in the presence of an alternating field, e.g., that generated by a float assembly, will be proportional to the number of turns and the area enclosed by one turn of the coil. Each inductor, L1 to L16, encloses an area of 1.5 mm by 10 mm and has 48 turns. Inductors L1 through L8 are connected via lines 482 to 496, respectively, to a first multiplexer, 498, which is grounded via line 500. Inductors L9 through L16 are connected via lines 512 to 526 to a second multiplexer, 528, which is at ground as shown at line 530. Multiplexers 498 and 528 are commercially available, for example, from Maxim Integrated Products, Inc. of Sunnyvale, Calif. as part number MAX4581EUE. Each inductor is paired with a resistor, the resistors being identified as R1 through R16. These resistors are provided for self testing. An a.c. stimulus may provided to these resistors and the resulting signal measured to test inductors L1 through L16 and their receive paths. Inductors L1 through L16 also are grounded.

Note that in the FIG. 11, no amplification of the RFID transponder coil signals was necessary as the signals generally will be on the order of hundreds of millivolts. The signal generated by inductors L1 through L16, however, will generally be on the order of 1 to 2 millivolts. Because of the weakness of the signals, an amplification circuit, 534, has been provided which is seen connected to the inductor network through multiplexers, 498 and 528, via lines 536 and 538. Between amplification circuit 534 and multiplexer 498 is capacitor 540 connected in parallel with resistor 544. A pair of capacitors 542 and 546 lead into the inverting input of operational amplifier 560 which is grounded at 562. Capacitor 548, at ground as indicated at line 564, is connected to the non-inverting input of amplifier 560. This gain stage amplifies the signal to a magnitude of 24 times its initial amplitude. The output of amplifier 560 leads into another gain stage including capacitor 566 and resistor 569, which is at ground as indicated at 570, connected to the inverting input of operational amplifier 578. The non-inverting input of operational amplifier 578 is connected to a capacitor 572 and a resistor 574 at ground as shown at 576. The output of amplifier 578 is connected to a resistor 580 and capacitor 584 connected in parallel. This is another 24 gain amplification stage. To the left of the amplification stages is a peak detector with a low pass filter including a Schottky diode at 586 connected through resistor 588 to ground at 590. Diode 586 also is connected to capacitor 592 to ground at 594 and to resistor 596 and capacitor 598 then to ground as at 600.

Multiplexers 498 and 528 also are connected via lines 606 and 608 to an inverter, 610, which is grounded via line 612. Inverter 610 is connected via line 613 to a microprocessor, 614, which is connected to ground via line 618 and to Vcc via line 618, through capacitor 620 to ground via line 622. Microprocessor 614 may be a 16 bit ultralow-power microprocessor with flash memory available from Texas Instruments of Dallas, Tex. as part number MSP430F1232IPW. Selectors A, B, and C of multiplexer 498 are connected to microprocessor 614 via lines, 626, 628, and 630, respectively. Likewise, selectors A, B, and C of multiplexer 528 are connected to microprocessor 614 via lines 632, 634, and 636. With multiplexers 498 and 528, and inverter 610, microprocessor 614 can select any inductor from the inductor network, including inductors L1 through L16. Power to inductors L1 through L8 is supplied by microprocessor 614 via line 638 through capacitor 640. Similarly, power is supplied to inductors L9 through L16 via line 642 through capacitor 644.

Microprocessor 614 also is connected to a 32.768 KHz crystal, 656, via lines 658 and 660. Two test inputs are identified at 662 and 664 connected to microprocessor 614 via lines 666 and 668, respectively. Amplification circuit 534 also is connected to microprocessor 614 via lines 670 and 672.

Looking to the right of microprocessor 614, a JTAG programming connector has been provided at 680. This connector component may be used to download programming to the flash memory contained within microprocessor 614 and is commercially available, for example, from Molex of Lisle, Ill. as part number 10-89-4082. Connector component 680 is connected to ground via line 862 and Vcc power via line 684 through resistor 685. On the opposite side of the chip, connector 680 is connected to microprocessor 614 via lines 686, 688, 690, and 692. Connector 680 also is connected to the test pin of microprocessor 614 via line 694.

Power start-up resistor 661 and capacitor 663 extend into the rest pin of microprocessor 614. At the bottom of FIG. 12 are female and male connector components, 702 and 704, such as those described in connection with FIG. 11. Female connector component 702 is commercially available, for example from Samtec, Inc of Cary, Ill. as part number SDL-105-G-10, while male connector component 704 also is commercially available, for example, from Samtec, Inc. as part number BDL-105-G-E. Connector components 702 and 704 are connected to one another via line 706 and to the reset pin of microprocessor 614 via line 708 through resistor 710. Both pins 1 and 2 of female connector component 702 are seen to connect to corresponding pins 1 and 2 of male connector component 704 via line 706. As with the design illustrated in FIG. 11, this redundancy is provided to ensure reliability. Likewise, pins 3 and 9 of female connector component 702 are seen to connect to corresponding pins 3 and 9 of male connector component 704 via line 712. Pins 4 and 10 of female connector component 702 receive transmissions from microprocessor 614 via line 714, while male connector component pins 4 and 10 transmit to microprocessor 614 via line 718. Pins 5 and 6 of female connector component 702 connect to corresponding pins 5 and 6 of male connector component 704 via line 720 and then to power via line 722 through resistor 724. Pins 7 and 8 of female connector component 702 connect to corresponding pins 7 and 8 of male connector component 704 via line 726 and then to ground via lines 728 and 730. Connectors 702 and 704 provide the communications line to transmit data from the inductor network on each rod segment along adjacent rod segments to control assembly 60 as described previously.

A two connection female jumper component, 732, extends across the two pin header of male connector component 704, which are connected to the TX and RX pins of microprocessor 614. Such a component is available from Molex of Lisle, Ill. as part number 22-12-2021.

One of the advantages of system 10 is that the float assemblies, as at 28 and 30, only periodically generate a low amplitude signal. Also, the sensing rod assembly rod segments are designed to power down to additionally conserve power. In view of the design of the float assemblies and sensing rod assembly, the timing of the generated float signals and the rod segment sensing must be coordinated to ensure accurate fluid level measurement.

If the float signal generated by a float assembly lasts 40 ms, for example, then to ensure that that float signal is detected, a rod segment must search for the float signal at least every 40 ms, and may be set to search, for example, every 38 ms. The microprocessor can only poll one inductor signal at a time, thus it scans through selecting each inductor in turn for a reading. These are read in sequence in quick succession such that the timing of the last reading is not greatly different from the first. Additionally, the embodiment shown in FIG. 12 does not have a resonant circuit for each inductor and, thus, there must be a small delay between each switching of the multiplexer and a reading. This is such that the resonance of the one match circuit can settle with the selected inductor, and so the detector LPF can settle to the new value, e.g., at least 100 us for search readings, and at least 200 us for measurement readings, described below, where more accuracy is required. Within the microprocessor, one timer compare register is used to define the repetition rate of the search readings.

When a float signal is detected, for the FIG. 11 embodiment each measurement comprises 4 samples taken with an interval of three-fourths of the float assembly signal. Of these 4 samples, the first and $3^{rd}$ are differenced, and the $2^{nd}$ and $4^{th}$ are differenced. This removes any d.c. component and increases the reading accuracy compared to using two quadrature samples only. These differenced values are then combined as root-sum-squares to give the a.c. amplitude independent of phase. For the FIG. 12 design, each measurement is simply a dc level measured by the microprocessor's analog-to-digital converter after an appropriate settling time.

When a float signal is detected, the microprocessor schedules a measurement reading for the next expected float burst time, using the second compare register. If neither the first (oil) nor the second (water) float assemblies currently are being tracked then both will be scheduled, but only one will find a signal at the time of the reading. If one float assembly is already being tracked on this processor then the other one is scheduled. If both float assemblies are being tracked then the search detection is ignored. Search readings are suppressed in the vicinity of the measurement readings, and while a serial port command is pending or active to avoid real time conflicts.

It is inevitable that the float assembly timing will be slightly different from the rod segment timing due to crystal differences and the measurement timing will slowly drift from the optimum mid-point timing. In order to compensate, the measurement algorithm includes a sample reading before or after the actual measurement reading. The sample reading is alternated before or after on each successive reading. If either sample reading is found to be below the expected level then the next reading interval is shifted earlier or later in order to adjust the next reading time towards the center of the burst.

Figure 13:
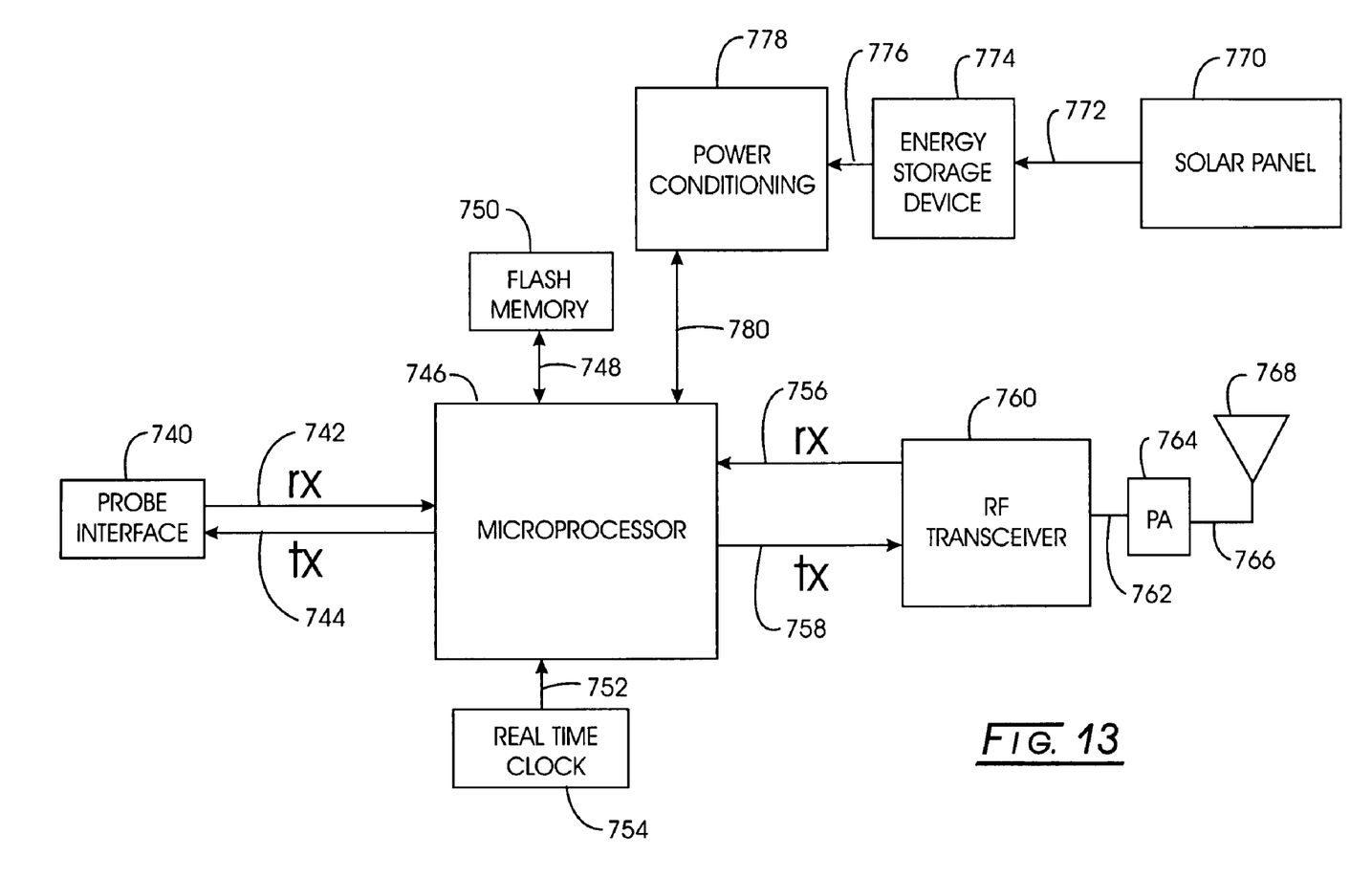
FIG. 13 is a block schematic diagram of one embodiment of a control assembly.

FIG. 13 illustrates, in block diagrammatic form, the function of control assembly 60, shown at the top of sensing rod assembly 26 in FIG. 1. Control assembly 60 is in electrical association with sensing rod assembly 26 as indicated at block 740. Signals from block 740 are transmitted to a microprocessor, 746, via line 742. Signals from microprocessor 746 are transmitted to block 740 as indicated at line 744. Microprocessor 746 includes programmable flash memory 750 associated by line 748. The output of a real time clock, indicated at block 754, is shown associated with microprocessor 746 via line 752. Data may be wireless transmitted to and from control assembly 60 to a remote location as indicated by lines 756 and 758 and RF transceiver block 760. Transceiver block 760 is connected via line 762 to associated amplification block 764 which is connected by line 766 to associated antenna 768. Control assembly 60 may be solar powered as indicated at block 770. Block 770 is connected via line 772 to an associated energy source device at block 774. Energy from block 774 is subject to power conditioning as indicated at line 776 and block 778 and then transmitted to microprocessor 746 as indicated by bi-directional arrow 780.

Control assembly 60 controls the timing of the sensing assembly's position signal generation, receives and analyzes that signal data to determine the fluid level of fluid contained with the container. As noted previously, the array of position signals generated by the inductors, for example, RFID transponder coils, coils integrally formed on a PCB, etc., generally will exhibit a Gaussian profile, with the peak of the curve indicating the position of the float assembly associated with that curve, and, thus, the corresponding fluid level. This simple analysis will accurately determine the fluid level of the fluid to within about 0.75 inch. Additional data analysis may be employed to determine the fluid level with even greater accuracy.

A non-linear regression analysis may be implemented as follows. The float assembly coil, such as that shown at 276 in FIG. 9, is a set of coplanar, concentric 12-sided polygons. For the purposes of this analysis, the float assembly coil will be oriented so that the coils are located in the x-y plane, with the center located at the origin. The inductor coils on the sensing rod assembly are located along the z-axis. Linear distances are normalized to the inductor coil spacing, so that each inductor coil is one "unit" apart. The location of the float assembly coil relative to the central inductor on a given segment is a distance "d".

A few approximations are made to simplify the analysis of the resulting data. Specifically, the polygonal shape of the float assembly coil will be approximated with a circular coil. The N concentric turns will be modeled by a single "lumped" circular coil with radius "a". The current through the "lumped" coil is the sum of the currents through the individual turns. Finally, the inductors will be modeled by the measurement of the magnetic field at a single zero-dimensional point.

For a circular loop of radius a carrying current I, the magnetic field along the central axis a distance z from the center of the loop is:

$$H = \frac{Ia^2}{2(a^2 + z^2)^{3/2}} \qquad \text{Equation 1}$$

The measured voltage on the ADC should follow the following form:

$$ADC = \frac{K}{(a^2 + z^2)^{3/2}} \qquad \text{Equation 2}$$

where $K \sim Ia^2$

Making the following substitutions:

$$y = \frac{1}{ADC^{2/3}}$$
$$C = K^{2/3}$$

Equation 2 reduces to:

$$1/y = \frac{C}{a^2 + z^2}$$

$$z^2 + a^2 = Cy \qquad \text{Equation 3}$$

For simplicity, assume the peak coil measurement occurs at sample 0 and the coil spacing is 1 "linear unit." Assume that the coil is actually located at position d. The three primary coil measurements generate the data shown in Table I.

TABLE I

| Coil | Measurement | Translated | Distance from coil to loop |
|---|---|---|---|
| −1 | ADC[−1] | y[−1] = ADC[−1]$^{-2/3}$ | 1 + d |
| 0 | ADC[0] | y[0] | D |
| 1 | ADC[1] | y[1] | 1 − d |

Substitute the measured points into Equation 3:

$$(d+1)^2 + a^2 = Cy[-1] \qquad \text{Equation 4}$$

$$d^2 + a^2 = Cy[0] \qquad \text{Equation 5}$$

$$(1-d)^2 + a^2 = Cy[1] \qquad \text{Equation 6}$$

In these equations, y[1a] are known, and d, a, and C are unknown. The goal is to solve for d as a function of known constants or variables.

Adding Equation 4 and Equation 6:

$$2d^2 + 2 + 2a^2 = Cy[-1] + Cy[1]$$

$$d^2 = \frac{Cy[-1] + Cy[1]}{2} - a^2 - 1 \qquad \text{Equation 7}$$

Subtract Equation 5 from Equation 7:

$$Cy[0] - a^2 = \frac{Cy[1] + Cy[-1]}{2} - 1 - a^2$$

$$C(y[1] + y[-1] + 2y[0]) = 2$$

$$C = \frac{2}{y[-1] + y[1] - 2y[0]} \qquad \text{Equation 8}$$

C is now known. Subtract the Equation 5 from Equation 4:

$$2d + 1 = Cy[-1] - Cy[0]$$

$$d = \frac{Cy[-1] - Cy[0] - 1}{2} \qquad \text{Equation 9}$$

From Equation 5, $$a = \sqrt{Cy[0] - d^2} \qquad \text{Equation 10:}$$

Using the above calculations, the control assembly can perform a curve fit that increases the accuracy of the fluid level measurement by a factor of approximately 5 times.

We claim:

1. A linear position indicator system for determining the first fluid level of a first fluid within a container and having a first fluid surface, comprising:

a sensing rod assembly extending substantially vertically within said container, said sensing rod assembly comprising a sensing rod having a plurality of releasably connectable rod segments, each said rod segment extending a given segment length and carrying a rod controller and a plurality of inductors spaced apart given distances along said segment length, each said inductor being responsive to a first float signal to generate one or more first position signals;

a first float assembly capable of floating at said first fluid surface and vertically movable along said sensing rod assembly, comprising (i) a coil energizable to emit said first float signal, (ii) a control circuit configured to periodically energize said coil;

(iii) a power supply electrically associated with said control circuit;

(iv) a fluid-resistant housing containing said coil, said control circuit, and said power supply;

a control assembly electrically associated with said sensing rod assembly and including a controller responsive to receive said first position signals generated by each said inductor and to determine from said first position signals said first fluid level of said first fluid in said container.

2. The linear position indicator system of claim 1 wherein said given length of each said rod segment is about 12 inches.

3. The linear position indicator system of claim 1 wherein said given length of each said rod segment is about 19 inches.

4. The linear position indicator system of claim 1 wherein each said rod segment comprises a printed circuit board with one surface extending between a first end and a second end, said first end bearing a first connector component and said second end bearing a second connector component.

5. The linear position indicator system of claim 4 wherein said first connector component comprises a male connector component having a plurality of connector pins extending perpendicularly to said one surface and said second connector component comprises a female connector component having a plurality of apertures corresponding to said connector pins.

6. The linear position indicator system of claim 1, wherein said plurality of inductors comprise radio frequency identification transducer coils.

7. The linear position indicator system of claim 4, wherein said plurality of inductors comprise radio frequency identification transducer coils.

8. The linear position indicator system of claim 4, wherein said plurality of inductors comprise a plurality of coils integrally formed on said printed circuit board.

9. The linear position indicator system of claim 4, further comprising a potting compound encasing said printed circuit board.

10. The linear position indicator system of claim 1, further comprising:
a sensing rod housing surmounting said sensing rod assembly and having a plurality of releasably connected housing segments.

11. The linear position indicator system of claim 9, wherein said sensing rod housing segments comprise fiberglass tubes extending a given length between a first end and a second end, said first and second ends bearing threads for releasably connecting said fiberglass tubes together.

12. The linear position indicator system of claim 1, wherein each said rod segment rod controller comprises a microprocessor.

13. The linear position indicator system of claim 1, wherein said first float assembly control circuit comprises a microprocessor.

14. The linear position indicator system of claim 1, wherein said control assembly controller comprises a microprocessor.

15. The linear position indicator system of claim 1, wherein said fluid-resistant housing comprises a potting compound.

16. The linear position indicator system of claim 1, wherein said container contains a second fluid having a second fluid surface, further comprising:
each said inductor of said sensing rod being responsive to a second float signal to generate a second position signal;
a second float assembly capable of floating on said second fluid surface and vertically movable along said sensing rod assembly, comprising
(i) a circuit having an integrally formed coil energizable to emit said second float signal,
(ii) a processor programmed to periodically energize said coil;
(iii) a power supply electrically associated with said processor;
(iv) a fluid-resistant housing containing said circuit, said processor, and said power supply;
said processor of said control assembly being programmed to receive said second position signal generated by each said inductor and to determine from said second position signals said second fluid level of said second fluid in said container.

17. The linear position indicator system of claim 15, wherein said container comprises a tank and said first fluid comprises oil and said second fluid comprises water.

18. The linear position indicator system of claim 1 further comprising a wireless assembly for transmitting generated data from said control assembly to a remote location.

19. A method for determining the fluid level of a fluid contained within a container and having a fluid surface, comprising the steps of:
(a) providing a plurality of releasably connectable rod segments, each rod segment extending a given rod segment length and having a plurality of inductors located along said length, each said inductor being responsive to a float signal to generate a position signal;
(d) determining a sensing rod assembly length based on the depth of said container;
(e) forming a sensing rod assembly having said rod assembly length by connecting a plurality of rod segments;
(f) disposing said sensing rod assembly generally vertically within said container;
(g) providing a float assembly that floats at said fluid surface and is vertically movable along said sensing rod assembly, said float assembly comprising a circuit having a coil excitable to generate a float signal corresponding to the position of said float assembly;
(g) periodically exciting said float assembly coil to generate said float signal;
(h) sensing said float signal with said inductors to generate a plurality of position signals; and
(i) analyzing said sensed position signals to determine said fluid level of said fluid in said container.

20. The method of claim 18, wherein said container contains a second fluid having a second fluid surface, further comprising the steps of:
(j) providing a second float assembly that floats on said second fluid surface and is vertically movable along said sensing rod assembly, said second float assembly comprising a circuit having an integrally formed coil actuable to generate a second float signal corresponding to the position of said second float assembly;
(g) periodically actuating said second float assembly coil to generate said second float signal;
(h) sensing said second float signal with said inductors to generate a plurality of second position signals; and
(i) analyzing said sensed second position signals to determine said second fluid level of said fluid in said container.

21. The method of claim 18, wherein said step (i) of analyzing said sensed position signals comprises performing a non-linear regression analysis.

* * * * *